July 3, 1951  G. F. CROESSANT  2,559,281
ANCHORING SOCKET FOR BOLTS
Filed July 1, 1948

INVENTOR
George Frederick Croessant.
BY
ATTORNEYS

Patented July 3, 1951

2,559,281

UNITED STATES PATENT OFFICE 2,559,281

ANCHORING SOCKET FOR BOLTS

George Frederick Croessant, Wyomissing, Pa.

Application July 1, 1948, Serial No. 36,475

3 Claims. (Cl. 85—2.4)

My invention relates to improvements in expansion bolts; more specifically, it relates to bolt anchoring sockets of the kind which are longitudinally collapsible so that an intermediate portion can be spread into anchoring engagement for anchoring bolts to walls, floors and the like for supporting structures such as mirrors, towel bars, medicine cabinets, curtain fixtures, etc. My invention is an improvement over that shown and claimed in my earlier Patent No. 2,018,251, issued October 22, 1935.

An outstanding disadvantage of anchoring sockets for bolts of the type shown in my earlier patent is that considerable force or torque is required for rotating the screw threaded bolt in order to effect longitudinal collapsing and transverse spreading of the intermediate strips of the socket for effecting anchoring engagement with a wall. In spite of the fact that weakened spots are formed on such strips by die grooves and angular cuts in an attempt to facilitate initial bending at predetermined points to cause collapsing of the strips, great manual effort is nevertheless required to initiate such bending and collapsing thereof. Another disadvantage of the specific construction of anchoring socket shown in my earlier patent is that numerous manufacturing steps are involved which unnecessarily add to the cost of manufacturing thereof.

An object of my invention, therefore, is to provide a novel anchoring socket for bolts that is devoid of the above-named disadvantages of my earlier patented structure (or "device"); that has an improved anchoring grip that may be retightened if necessary, and that will permit repeated withdrawals and reengagements of the associated bolt.

A more specific object of my invention is to provide, in an anchoring socket of the type hereinabove described, cutouts at an end portion of the intermediate collapsible strips and to gradually taper the strips so as to be of narrowest width near the centers thereof in order to greatly facilitate initial bending of the strips at the end and central portions during collapsing movement thereof.

A further object of my invention is to provide an anchoring socket of simple construction that will be inexpensive to manufacture and assemble.

Other objects and advantages of the present invention will become apparent from a study of the following specification taken with the accompanying drawing wherein.

Figure 1:
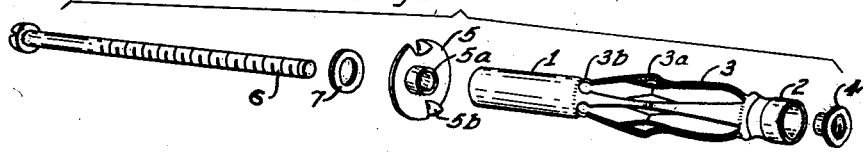
Fig. 1 is a perspective exploded view of the anchoring socket component parts and associated bolt of a preferred embodiment of my invention.

Referring more particularly to Fig. 1 of the drawing, my improved socket comprises a bolt supporting sleeve 1 and a spaced aligned nut supporting sleeve 2, which sleeves are integrally joined together by a plurality of flat intermediate circularly spaced connecting strips 3. These sleeves and intermediate connecting strips are die stamped from a single sheet of metal which is bent into cylindrical shape and its opposite end portions soldered or welded together.

During the die stamping operation, holes 3b are also stamped at the left end portions of the strips, as viewed in Fig. 1, for the purpose of providing weakened spots to facilitate bending, as will be described more fully hereinafter. As the anchor is formed and soldered or welded together, it is desirable to provide a slight angling of the left portions of the strips, an initial bend 3a adjacent the center, a slight knee toward the right, and curve at the extreme right end of the strips, as shown in Fig. 1, to facilitate initial bending and outward collapsing of the central portions of the strips. Of course, strips 3 may extend along straight lines, instead, if desired, in which case, greater manual effort will be required to initiate bending.

Figure 2:
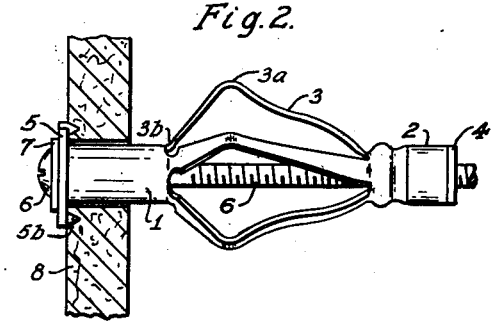
Fig. 2 is a side view of the assembled socket illustrated in Fig. 1 and shown extending through a wall aperture in a partially expanded or collapsed position.

The strips form transversely spreadable anchoring portions when intermediately outwardly bent by the longitudinally collapsing force exerted by a threaded bolt as will be described more fully hereinafter. A nut 4 has a flange portion which is welded or soldered to sleeve 2. A disk-like element 5 has an integral tubular portion 5a which is soldered or welded to the interior wall of the end portion of sleeve 1. Disk-like element 5 has a plurality of outwardly struck, wall engaging teeth 5b. A screw threaded bolt 6 is extended through a washer 7 as well as through the centers of disk-like element 5 and sleeves 1 and 2 and is threaded to nut 4, as shown in Figs. 2 and 3.

In operation, after a hole of slightly larger diameter than sleeve 1 is drilled in a wall or partition 8 of smaller width than the length of the sleeve, the entire anchoring socket assembly is extended therethrough, the intermediate strips being substantially straight, as shown in Fig. 1, so as to have an outer diameter which is equal to or less than that of the hole. An end portion of bolt 6 is threaded in the nut 4 and forms part of the assembly inserted through the hole. Bolt 6 is then rotated by a screwdriver, thereby exerting a longitudinal force tending to axially draw sleeves 1 and 2 together and in so doing will exert an outwardly expanding force on the connecting strips 3. Inasmuch as these strips are narrowed in width at portion 3a which is located less than halfway from the left end of the strip, as viewed in Figs. 1 and 2, and since the strips have a slight initial bend and knee, as shown in Fig. 1, the strips will bend outwardly at 3a, as shown in Fig. 3. Also, inasmuch as holes 3b are formed at the left end of the strips, as viewed in Figs. 1 and 2, they will provide weak spots at such end to cause outward bending thereat. Thus, as bolt 6 is turned and screwed through nut 4, the strips 3 will collapse outwardly in the manner shown in Fig. 2, and upon completion of the rotating movement of the bolt 6, the portions 3a of the strips will bend back in the direction towards the inner surface of the wall 8, as shown in Fig. 3, so as to exert pressure thereagainst to firmly anchor the socket assembly to the wall.

The circularly spaced wall engagement of the substantially central bends of strips 3 provides an enlarged base support to fixedly anchor the nut 4; engages a wall surface removed from any weakness caused by the aperture made for the sleeve 1; permits retightening if required by further axial movement of nut 4; and reduces the variety of required sizes by successfully operating on walls of different thickness within a given range. Furthermore, the bolt may be freely removed, after its anchoring action has been completed, and replaced as often as required with no loosening effect on the anchoring socket. The effective anchoring of the socket is secured by the special construction of the anchoring strips 3 as above described, which causes them to spread outwardly at their intermediate bends at 3a as the nut 4 is drawn toward the sleeve 1 by the bolt 6. The longer lengths of the nut engaging portions of the strips will cause the shorter lengths to radially spread from their sleeve engaged ends through arcs sufficiently greater than 90° to contact the intermediate bends formed at 3a with the inner wall surface at spaced distances from said sleeve. When any single strip 3 meets an obstruction, as a wall studding or corner, such as in a hollow tile, it may individually assume any distorted variation of its bending without affecting the anchoring grip of the remaining strips. Wall 8 may be of usual lath and plaster, or any of the known compositions or plasterboard, hollow tile, etc. It should be especially noted in Fig. 3 that when the strips are completely expanded and clamped against the inner wall surface, the strip portions extending from sleeve 2 assume a double curvature in opposite directions, providing knees in such strip portions, which tend to form a rigid and yieldable anchoring structure to assure constant clamping pressure between the strips and the inner surface of the wall. That is to say, if the bolt were screwed still further than as shown in Fig. 3, it would merely accentuate the double curvature of the aforesaid strip portions and increase the clamping pressures exerted against the inner surface of the wall. The anchoring grip may readily be made stronger if, for some reason it becomes inadequate, merely by retightening bolt 6 by a few additional turns. Repeated withdrawals and reengagements of the associated bolt may be made.

Figure 3:
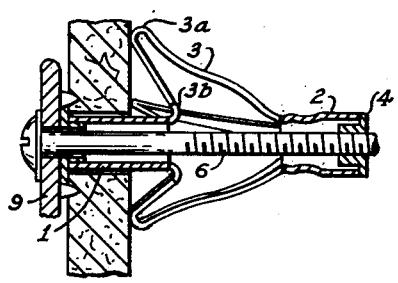
Fig. 3 is a longitudinal cross-sectional view taken along line III—III of Fig. 4 and showing the socket of Fig. 2 in a fully expanded position, anchored against the inner surface of a thin wall.
Figure 4:
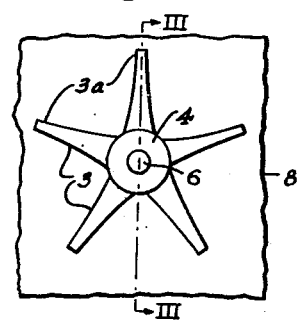
Fig. 4 is a plan or end view of the socket shown in Fig. 3 as viewed from the interior of the wall.

After the strips of the socket have been expanded into clamping position shown in Fig. 3, the bolt 6 is unscrewed therefrom and a bracket or portion 9 of an article (shown broken away) that is to be supported by the wall is inserted between the washer 7 and sleeve-like element 5. The bolt 6 is then reinserted and threaded to nut 4, or perhaps another bolt that is longer than bolt 6 may be used instead to accommodate a thicker bracket 9.

In cases where it is desired merely to anchor the above-described socket in a drilled hole, such as in the case of exceptionally thick walls or floors, that is, where the wall or floor is thicker than the length of sleeve 1, it is merely necessary to rotate bolt 6 and thereby expand strips 3 slightly as shown in Fig. 2, that is, until the expanded diameter approximates that of the interior diameter of the hole, after which the bend portions 3a will engage and become embedded in the inner surface of the hole and thereby will become firmly anchored to such surface.

An important feature in the construction of the anchor is that of making the sleeves 1 and 2 and the interconnecting strips 3 out of a single piece of sheet metal, wherein dies are used to make the cutouts to properly shape and taper the strips as well as to provide holes 3b at one end thereof. This greatly simplifies and reduces the cost of manufacture. The subsequent soldering or welding of nut 4 and disk-like element 5 to the ends thereof is a simple matter and can be done in the same operation.

Thus, it will be seen that I have provided a relatively simple, efficient and inexpensive anchoring socket providing a sturdy and assured anchor for an associated bolt and which constitutes a substantial improvement over the structure described and claimed in my earlier patent, hereinabove referred to, particularly since it greatly reduces the torsional effort or twist necessary for rotating the bolt to obtain initial expansion of the connecting strips to cause bending at the desired points when expanding and anchoring the strips to a wall or floor. Also, by tapering the strips and forming slots at one end thereof, weakened spots are provided to assure bending at predetermined points with the exertion of minimum manual turning effort on the bolt. Also, I have provided a construction which is simple to assemble and extremely inexpensive to manufacture.

While I have illustrated and described a certain specific embodiment of my invention, it will be understood that this is by way of illustration only, and that various changes and modifications may be made within the specification and within the scope of the following claims.

I claim:

1. A wall clamping socket for bolts comprising a sleeve and nut in spaced coaxial relationship and interconnected by a plurality of longitudinally extending, transversely flat strips which are integral with said sleeve and nut, each of said strips being gradually tapered in width from said sleeve and nut to an intermediate point which is closer to said sleeve than to said nut, the edge portions of said strips adjacent said sleeve having arcuate cutout portions to provide weakened spots, said strips having reverse bends extending radially inwardly and longitudinally from said intermediate point to a point adjacent said nut and terminating in an outward curve at the point of connection with the nut, whereby as the nut and sleeve are drawn together said strips will be collapsed outwardly and said intermediate points will be brought into engagement with the rear surface of a wall when said sleeve is extended through a hole in said wall, and whereby said reversely bent strip portions form a yieldable anchor which will not become loosened as the result of excessive vibration.

2. A wall clamping socket for bolts, comprising a pair of sleeves in spaced coaxial relationship, a nut attached to one of said sleeves, said sleeves being interconnected by a plurality of longitudinally extending, transversely flat strips which are integral with said sleeves, each of said strips being gradually tapered in width from said sleeves to an intermediate point which is closer to one sleeve than the other, nut-attached sleeve, the edge portions of said strips adjacent to said one sleeve having arcuate cutout portions to provide weakened spots, said strips having reverse bends extending radially inwardly and longitudinally from said intermediate point to a point adjacent said nut-attached sleeve and terminating in an outward curve at the point of connection with the nut-attached sleeve, and a threaded bolt extending through said sleeves and threadedly engaged with said nut for drawing said sleeves axially together upon turning of the bolt, whereby said strips will be collapsed outwardly and said intermediate points will be brought into engagement with the rear surface of a wall when said one sleeve is extended through a hole in said wall, and whereby said reversely bent strip portions form a yieldable anchor which will not become loosened as the result of excessive vibration.

3. A wall clamping socket as recited in claim 2 together with a washer-like element with wall piercing wings integrally formed on the end of said one sleeve and wherein the head of said bolt is in force-transmitting engagement with said washer-like element.

GEORGE FREDERICK CROESSANT.

REFERENCES CITED

The following references are of record in the file of this patent:

UNITED STATES PATENTS

| Number | Name | Date |
|---|---|---|
| 1,881,973 | Schmitt | Oct. 11, 1932 |
| 2,017,421 | Post | Oct. 15, 1935 |
| 2,018,251 | Croessant | Oct. 22, 1935 |
| 2,092,682 | Roske | Sept. 7, 1937 |
| 2,148,977 | Buck | Feb. 28, 1939 |